United States Patent [19]
Matsumoto

[11] Patent Number: 5,346,660
[45] Date of Patent: Sep. 13, 1994

[54] METHOD OF MANUFACTURING POWDER MOLDING

[75] Inventor: Akio Matsumoto, Fukuoka, Japan

[73] Assignee: Toto Ltd., Fukuoka, Japan

[21] Appl. No.: 22,776

[22] Filed: Feb. 23, 1993

Related U.S. Application Data

[63] Continuation of Ser. No. 730,669, Jul. 16, 1991.

[30] Foreign Application Priority Data

Sep. 7, 1990 [JP] Japan .................. 2-238747

[51] Int. Cl.$^5$ .................. B28B 1/08; B28B 1/20; B28B 1/26
[52] U.S. Cl. .................. 264/69; 264/71; 264/86; 264/87; 264/311
[58] Field of Search .................. 264/71, 69, 72, 86, 264/87, 311

[56] References Cited

U.S. PATENT DOCUMENTS

| | | | |
|---|---|---|---|
| 2,944,316 | 7/1960 | Maxwell et al. | 264/311 X |
| 3,847,635 | 11/1974 | Lange et al. | 106/736 X |
| 4,297,309 | 10/1981 | North | 264/56 |
| 4,624,808 | 11/1986 | Lange . | |
| 4,816,182 | 3/1989 | Novich et al. | 264/86 X |
| 4,904,411 | 2/1990 | Novich et al. | 264/212 X |
| 4,917,842 | 4/1990 | Currie et al. | 264/63 X |
| 4,937,014 | 6/1990 | Canestri | 106/505 X |
| 4,978,643 | 12/1990 | Venkataswamy et al. | 264/63 X |
| 5,028,633 | 7/1991 | Ohno et al. | 264/13 X |
| 5,047,181 | 9/1991 | Occhionero et al. | 264/63 X |
| 5,047,182 | 9/1991 | Sundback et al. | 264/63 X |

FOREIGN PATENT DOCUMENTS

| | | |
|---|---|---|
| 0288208 | 4/1988 | European Pat. Off. . |
| 3617687 | 5/1986 | Fed. Rep. of Germany . |
| 60-96579 | 5/1985 | Japan . |
| 8706495 | 11/1987 | PCT Int'l Appl. . |

OTHER PUBLICATIONS

Chemical Abstracts, vol. 109, No. 18, Oct. 31, 1988.
Chemical Abstracts, vol. 111, No. 6, Jul. 7, 1989.

*Primary Examiner*—Karen Aftergut
*Attorney, Agent, or Firm*—Irving M. Weiner; Joseph P. Carrier; Pamela S. Burt

[57] ABSTRACT

A powder molding is manufactured from various powdery materials including an inorganic material, an organic material, a metallic material, etc., according to a wet forming process. A powdery material and a solvent are mixed into a mixture so that the mixture exhibits a dilatant flow. The mixture is molded into a molding of desired shape, and then the molding is dried.

12 Claims, 2 Drawing Sheets

METHOD OF MANUFACTURING POWDER MOLDING

This is a file-wrapper-continuation of U.S. patent application Ser. No. 07/730,669, filed Jul. 16, 1991, abandoned.

BACKGROUND OF THE INVENTION

Field of the Invention

The present invention relates to a method of manufacturing a powder molding as a final or semi-finished product from various powdery materials including an inorganic material, an organic material, a metallic material, etc., according to a wet forming process, and more particularly to a method of manufacturing a powder molding having a high packing density.

Description of the Relevant Art

Various many products including medical products, foods, etc. are manufactured from powdery raw or intermediate materials which may be metallic materials, sintered materials, hydraulic materials, etc. The powdery materials are molded into final or semi-finished products of desired shape.

One of the important characteristics which affect the properties of powder moldings is packing characteristics. The packing characteristics include packing uniformity and packing fraction.

Some products with functional gradients, i.e., varying functional capabilities, should preferably be molded with less packing uniformity. Smaller packing fraction is preferable when the porosity of molded products is important. In most cases, however, powder moldings of high packing uniformity and large packing fraction are desirable because the packing uniformity leads to uniform physical properties and the large packing fraction achieves high mechanical strength.

Sintered products of powdery ceramic materials are manufactured by a process which includes a firing step after a molding step, and have a packing fraction close to 1. Since the porosity of a molded product of a powdery ceramic material is the same as the firing shrinkage percentage, a molded product of a larger packing fraction is subject to smaller firing shrinkage, and can be sintered into a sintered product of high dimensional stability and complex shape. Self-sintering ceramic materials such as silicon carbide may be fired at lower temperature if they are molded with a large packing fraction.

Generally, the=e are two processes available to mold powdery materials. According to one process, known as a dry molding process, a powdery material is filled in a mold and subjected to high pressure. The other process is called a wet molding process in which a powdery material and a solvent are mixed, the mixture is molded to desired shape, with the solvent being removed while and/or after the mixture is molded. The principles of the present invention are based on the wet molding process.

A powdery material is typically molded according to the wet molding process as shown in FIG. I of the accompanying drawings.

The molding process is broken up into steps (I), (iI), (ZII), and (IV) which are defined as follows:

(I) A powdery material and a solvent are mixed into a mixture, from which a molding is to be formed: It is assumed that the powdery material in the mixture has a volume fraction of F1.

(II) Immediately after the mixture is molded to desired shape: While the mixture is being molded, the solvent is partly removed. The powdery material has a volume fraction of F2.

(III) The molded mixture is dried and shrunk: In the drying step, the solvent is partly removed, allowing the molding to shrink accordingly. The volume fraction of the powdery material is F3.

(Iv) After the molded mixture is dried: The remaining solvent in the step (III) is replaced by air. The volume fraction or packing fraction of the powdery material in the molding is F3.

The above process represents an ordinary process. There are some other processes which do not follow the above process. For example, part of the remaining solvent in the step (III) may not be replaced by air, but may work to shrink the molding further, or may be replaced by another solvent, not air. The process may be completed at the step (III). The fractions may satisfy the relationship F1 - F2 - F3 if water used for hydrarich is not contained in the volume fraction of the powdery material as when concrete is molded or a castable refractory is molded without using a water-absorbing mold. However, the relationship F1 <F3 is employed in the present invention.

Heretofore, in order to produce powder moldings of large packing fraction, there has been employed a powdery material having a particle size distribution in which minute particles are filled in gaps between larger particles, and much smaller particles are filled in gaps between the minute parrOt! es. During the molding step, the mixture of the powdery material and the solvent is rendered thixotropic so that the molded product will nearly be of closest packing condition.

Flowability of the mixture of a powdery material and a solvent during the molding step will now be described in detail below. The mixture of a powdery material and a solvent exhibits various flow patterns including a dilatant flow pattern and a thixotropic flow pattern. The dilatant flow pattern is indicated by the curves A1, A2 in FIG. 2, in which when a shear stress S is given to the mixture of a powdery material and a solvent, the rate of increase of a shear rate V decreases as the shear stress S increases. The thixotropic flow means that, as indicated by the curves B1, B2 in FIG. 2, the rate of increase of the shear rate V increases as the shear stress S increases. The actual flowability of the mixture is characterized by a combination of nine flow patterns including the dilatant and thixotropic flow patterns. The dilatant and thixotropic flow patterns are understood to degenerate from the other flow patterns. The term "dilatant flow" as used in the present invention signifies a region where the volume fraction of the powdery material in the mixture is high, including a transitional region from the thixotropic flow to the dilatant flow, and means a most undesirable flow as it obstructs the ease with which the mixture is kneaded or stirred or poured into the mold.

The dilatant flow is expressed by:

$$n = d\, logS/d\, logV$$

with respect to the shear stress S and the shear rate V at any desired point on the flow curves shown in FIG. 2. The larger the numeral n, the stronger the dilatant flow, and the smaller the numeral n, the snronger the thixotropic flow. The dilatant flow can often be sensed by the worker based on the resistance to =he stirring of the mixture because when the mixture is stirred, the viscosity thereof is increased, requiring the worker to exert more forces to stir the mixture or sometimes making it impossible for the worker to stir the mixture.

Efforts to exploit the dilatant flow have not been made except for certain limited applications such as cushioning materials, adhesives, etc.

Heretofore, the volume fraction F1 of the slip, or the mixture Of a powdery material and a solvent, used in the slip casting of a ceramic product has been about 0.45, and has not exceeded 0.55.

In the slip casting process, a powdery ceramic material, a powdery metallic material, etc. are dispersed into a solvent, thus making a slurry. The slurry is then poured into a porous mold, and the solvent is partly absorbed into the porous mold due to capillary action of the pores, gravity, pressure, or centrifugal forces generated when the mold rotates. The slurry with the solvent thus removed is formed into a molding by the mold.

It is difficult to control the particle size distribution of the powdery material whose volume fraction F1 is small in the mixture and it is therefore difficult to cause the molding no achieve a closest packing condition. Even if the particle size distribution of the powdery material can be controlled, the powdery material tends to agglomerate in the mixture, and hence a powder molding of high packing fraction cannot be produced in most cases.

For the above reasons, even if the slip casting is carried out while controlling the particle size distribution of the powdery material with the volume fraction F1 being 0.55 or smaller, the packing fraction of the resultant molding is 0.55 to 0.7 at most when a powdery ceramic material is molded by slip casting using a plaster mold under atmospheric pressure, and 0.45 to 0.65 at most if a fine ceramic powder of submicron particles is molded by slip casting.

Injection molding of ceramic materials, which has recently been carried out in research activities, employs a slurry with a considerably large F1. However, the slurry has to be kept at high temperature and the equipment required is large in scale because the slurry is kept in a highly viscous condition at high temperature and forcibly injected into a mold by a plunger, a screw, or the like.

To manufacture products of complex shape, such as ceramic engines or Ceramic machine parts, there has been a demand for a process capable of simply manufacturing powder moldings of higher packing fraction and hence smaller firing shrinkage percentage.

SUMMARY OF THE INVENTION

It is an object of the present invention to provide a method of manufacturing a powder molding which has a much higher packing fraction than those of conventional powder moldings, is of high dry strength, and has a small firing shrinkage percentage.

According to the present invention, there is provided a method of manufacturing a powder molding, comprising the steps of mixing a powdery material and a solvent into a mixture, molding said mixture into a molding of desired shape, and drying the molding. When the powdery material and the solvent are mixed together, the mixture is adjusted so that it exhibits a dilatant flow. The initial mixture of the powder material and the solvent has a volume fraction F1 of the powdery material, the mixture as molded into the desired shape has a volume fraction F2 of the powdery material which is greater than the volume fraction F1, the dried molding has a volume fraction F3 of the powdery material which is also greater than the volume fraction F1, and the volume fraction F1 is adjusted to a value at least as large as a value where the resulting volume fraction F3 abruptly rises relative to a small marginal increase of the volume fraction F1.

According to the present invention, there is also provided a method of manufacturing a powder molding of a powdery ceramic material by slap casting. When a powdery ceramic material and a solvent are mixed into a mixture, the powdery ceramic material in the mixture has a volume fraction ranging from 0.58 to 0.75;

The above and further objects, details and advantages of the present invention will become apparent from the following detailed description of preferred embodiments thereof, when read in conjunction with the accompanying drawings.

DETAILED DESCRIPTION

The relationship F1<F3, particularly the relationship F1<F2, as described above, is employed in the present invention.

Figure 1:
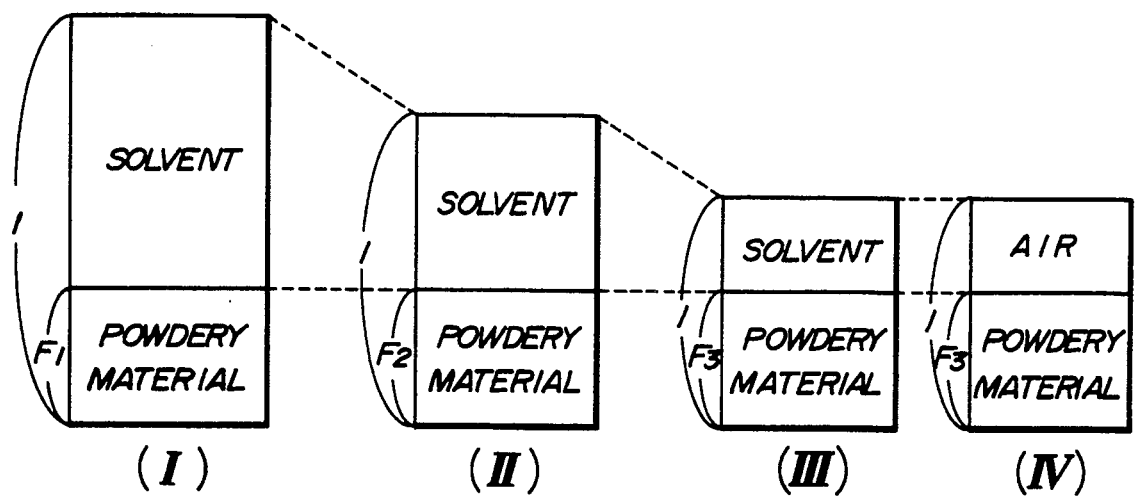
FIG. 1 is a diagram illustrative of volume fractions of a powdery material in a mixture in various steps of a process o#manufacturing a powder molding.
Figure 2:
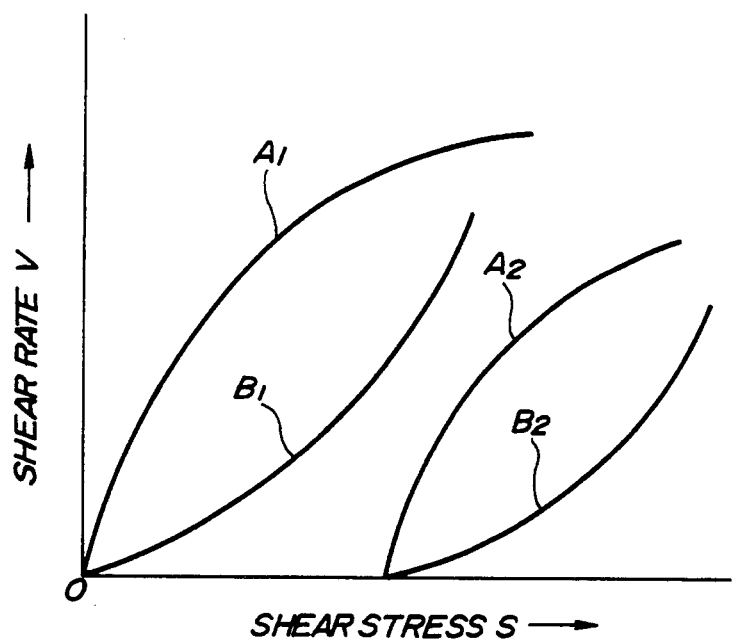
FIG. 2 is a graph showing dilatant flow patterns according to the present invention and thixotropic flow patterns according to the prior art.

The relationship FI <F2 is achieved when the process shown in FIG. 1 goes from the step (I) to the step (II), if slip casting, molding, tape molding, press molding, dip molding, or =he like is employed. Particularly, slip casting is preferably employed in the method of the present invention.

According to the present invention, various powdery materials including inorganic, organic, and metallic materials may be used as raw materials. Furthermore, other materials than general powdery materials, such as short fibers, whiskers, or the like which may be treated as powdery materials, may also be employed in the present invention.

In slip casting, all ceramic materials may be molded. This includes fine ceramic materials, such as alumina, silicon nitride, silicon carbide, sialon, zirconia, mullite, cordierite, etc. This also includes conventional ceramic materials mainly composed of natural materials, such as clay, porcelain stone, feldspar, silica stone, etc.

According to the present invention, there is also employed a solvent which is mixed with and disperses the powdery material without reacting therewith. Depending on the type of the powdery material used, water or any of various organic solvents is employed.

To the mixture of the powdery material and the solvent, there my be added a dispersing agent, an agglomerating agent, a deflocculating agent, a surface active agent, a lubricant, etc.

The mixture may be caused to exhibit a dilatant flow by adjusting the mixture ratio of the powdery material and the solvent so that the proportion of the solvent is reduced. Normally, the mixture ratio is adjusted by varying the ratio of the solvent to the powdery material. If the viscosity of the mixture is too high to effect subsequent crushing, mixing, and stirring of the mixture, then the solvent may be charged at a proportion greater than the predetermined proportion. Then, before the mixture is poured into the mold, the excessive solvent may be removed by evaporation, filtering, or re-mixing Of the filter press cake.

Alternatively or additionally, the particle size distribution of the powdery material may be adjusted to make the mixture dilatant by concentrating the particle size distribution in a certain particle size range, or removing minute particles, or adding large particles. This process is the reversal of a process of manufacturing a castable product with no dilatant flow. This process is especially effective if it is difficult to obtain dilatancy by adjusting the mixture ratio of the powdery material and the solvent, e.g., if the viscosity of the mixture is too high to handle the mixture because of a reduced solvent ratio, or if a large amount of plastic clay is contained in the mixture thereby preventing the mixture from being dilatant.

According to the present invention, the packing fraction of a powder molding can be increased by making dilatant the mixture of a powdery material and a solvent or by selecting the volume fraction of a powdery ceramic material in a mixture to be in the range of from 0.58 to 0.75. The reason why the packing fraction of the powder molding is increased by such a processing step appears to be as follows:

The mixture Of a powdery material, contained at a high ratio, and a solvent has an agglomeration of particles in a coarse particle structure with the solvent held therein in a free state. When external forces are applied to the mixture, the particle structure is re-arranged, discharging the free solvent, and is packed, resulting in a molding of high packing fraction.

The external forces may be applied by vibrating the mixture, making it possible to mold the mixture which is difficult to handle because of the high viscosity. For example, if vibration is exerted to a mixture of high volume fraction F1 which is substantially not flowable, such as a press cake produced by a filter press, the particle structure is re-arranged, discharging the free solvent. The mixture is now rendered apparently flowable, so that the mixture can be poured into a mold, for example.

The process of applying vibration to the mixture is totally different in principle to the conventional vibration molding process (also known as thixotropic molding). According to the thixotropic molding process, vibration is applied to a highly thixotropic mixture of a powdery material and a solvent to add a high shear stress, thereby lowering the viscosity of the mixture. After the mixture is poured into a mold, the vibration is removed to allow the mixture to be solidified.

The mixture used in the present invention is, however, of high dilatancy, and becomes highly viscous by adding a shear stress 1. The mixture which is rendered flowable apparently by the vibration can flow, but gives an extremely hard tactile sensation when touched while flowing.

The present invention will now be described below in specific detail.

Figure 3:
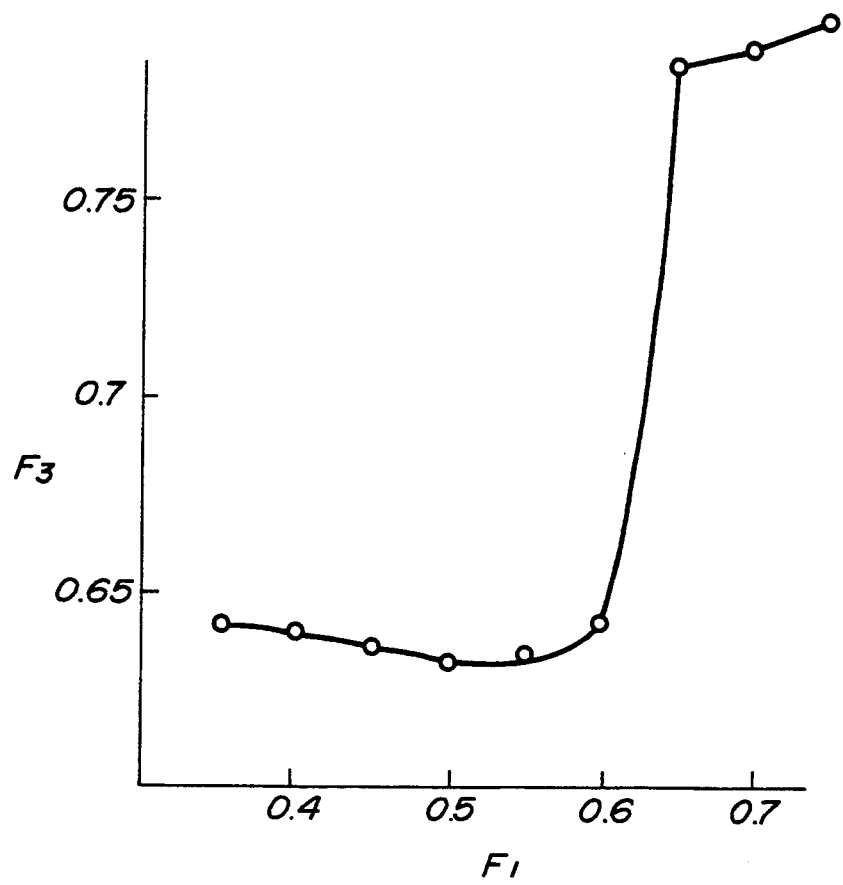
FIG. 3 is a graph showing the relationship between a volume fraction F1 of =he powdery material in a slip or mixture and the packing fraction F3 of the powdery material in a powder molding.

There were prepared nine slips or mixtures of powdery alumina, as a powdery material, and water, as a solvent, with the powdery alumina having a true specific gravity of 3.92 and an average particle diameter of 1 μm. The powdery alumina in the prepared slips had volume fractions F1 (reference should be made to the description with reference to FIG. 1) ranging from 0.35 to 0.75. The slips were molded in plaster molds under atmospheric pressure by slip casting. The relationship between the volume fractions F1 of the powdery alumina in the slips, the packing fractions of the moldings thus produced, and the viscosities of the slips is shown in Table 1 below in which the slips are numbered Nos. 1 through 9. The relationship between the volume fractions F1 and the packing fractions F3 is shown in FIG. 3.

TABLE 1

| Slip No. | F1 | F3 | Viscosity (CP) |
|---|---|---|---|
| 1 | 0.35 | 0.64 | 25 |
| 2 | 0.4 | 0.638 | 38 |
| 3 | 0.45 | 0.635 | 50 |
| 4 | 0.5 | 0.631 | 120 |
| 5 | 0.55 | 0.631 | 280 |
| 6 | 0.6 | 0.64 | 530 |
| 7 | 0.65 | 0.782 | 950 |
| 8 | 0.7 | 0.786 | 3200 |
| 9 | 0.75 | 0.792 | 28000 |

When a stirring rod was placed in the slip No. 7 and the slip No. 7 was stirred with the stirring rod, a slight resistance was felt. When the slip No. 8 was stirred with a stirring rod, a considerable resistance was felt. When the slip No. 9 was stirred with a stirring rod, the slip around the stirring rod was solidified making it impossible to move the stirring rod. The slip flowability changed between the slip NO. 6 and the slip No. 7. The slips Nos. 6 through 9 exhibited the dilatant flow. FIG. 3 indicates that the packing fraction F3 abruptly increased between the F1 values of 0.6 and 0.65 which correspond the slip No. 6 and the slip No. 7, respectively.

The slip No. 9 was filled in the mold while the slap No. 9 was being vibrated. The container which contained the slip and the plaster mold which was placed directly underneath the container were given a vibration at 60 Hz, making the slip flowable and filling the slip in the mold with ease.

The results of the above experimentation indicate that slips exhibiting the dilatant flow can be molded into powder moldings with much higher packing fractions F3 than those of other slips.

The value of the volume fraction F1 at which the packing fraction F3 abruptly rises varies depending on the kind of powdery material used and the particle size distribution thereof.

For example, if the particle size distribution is selected for larger particles, the value of the volume fraction F1 at which the packing fraction F3 abruptly rises becomes smaller. If the average particle diameter of the alumina powder in the slips is 2.1 μm, then the volume fraction F1 and the packing fraction F3 are related as shown in Table 2 below.

TABLE 2

| Slip No. | F1 | F3 |
|---|---|---|
| 1 | 0.45 | 0.649 |
| 2 | 0.52 | 0.645 |
| 3 | 0.56 | 0.649 |
| 4 | 0.58 | 0.728 |
| 5 | 0.6 | 0.74 |
| 6 | 0.63 | 0.742 |

As can be seen from Table 2, if the alumina powder had an average particle diameter of 2.1 μm, the value of the volume fraction F1 at which the packing fraction F3 abruptly rises ranges between 0.56 and 0.58.

The relationship between the volume fraction F1 and the packing fraction F3 in slips Nos. 1 through 6 each of a mixture of partially stabilized zirconia powder and water, the zirconia powder having an average particle diameter of 0.6 μm, is shown in Table 3 below:

TABLE 3

| Slip No. | F1 | F3 |
|---|---|---|
| 1 | 0.40 | 0.551 |
| 2 | 0.45 | 0.568 |
| 3 | 0.50 | 0.582 |
| 4 | 0.55 | 0.584 |
| 5 | 0.60 | 0.582 |
| 6 | 0.63 | 0.701 |

Table 3 indicates that the value of the volume fraction F1 at which the packing fraction F3 abruptly rises lies between 0.60 and 0.63.

As described above, a ceramic molding with a high packing fraction F3 can be produced from a slip having a high volume fraction F1. If the volume fraction F1 were too high, however, the viscosity of the slip would be too high to stir the slip easily. Generally, the volume fraction F1 should be about 0.75 at most.

As can be seen from FIG. 3, if an attempt was made to increase the volume fraction F1 of the conventional slips whose volume fraction F1 is 0.55 or less, then the packing fraction F3 of the ceramic molding would not be increased, Further, since the Slip contains many particles per unit volume, the particles would be liable to agglomerate into a floc of coarse structure. The packing fraction F3 would be reduced rather than it would approximately be equalized to the volume fraction F1 as with the casting of concrete. It follows, therefore, that the process of increasing the packing fraction F3 by increasing the volume fraction F1 in the slip Casting as is the case with the present invention could not be possible with the conventional process.

With the conventional slips whose volume fraction F1 is 0.55 or less, the packing fraction F3 may slightly be increased when the volume fraction F1 is increased. This is because either a large amount of dispersing agent is added to prevent the slap particles from agglomerating for thereby improving the dispersion of the particles in the solvent, or the slip particles agglomerate before they are deposited on the mold surface since the deposition of the slip particles is relatively slow. The slips whose volume fraction F1 ranges from 0.40 to 0.50 exhibit such a tendency. With there slips, however, the packing fractions F3 were not intentionally increased, and did not sharply rise as shown in FIG. 3.

Inventive Example and Comparative Example will be described below.

INVENTIVE EXAMPLE

| Compositions: | |
|---|---|
| Alumina (AES-21 made by Sumitomo Chemical Co., Ltd.) | 50 parts by weight |
| Alumina (AL-43M made by Sumitomo Chemical Co., Ltd.) | 50 parts by weight |
| Polycarboxylic acid ammonium salt SELNA D-305, polycarboxylic acid ammonium salt, | 0.3 part by weight |
| Acrylic emulsion (WA-320 made by Chukyo Yushi Co., Ltd.) | 0.8 part by weight |
| Magnesium carbonate (Wako Junyaku Co., Ltd.) | 0.1 part by weight |
| Water | 12.5 parts by weight |

These materials, together with alumina balls, were placed in an alumina pot, and crushed into a slip by a ball mill for 48 hours. The true specific gravity of alumina was 3.92, and the volume fraction F1 of the powdery material in the slip was 0.671. The particle size distribution of the slip was measured by a light-dispersion-type particle size distribution meter. The particles whose diameter is 1 μm or more were of 18.8 volume %, the particles whose diameter ranges from 0.5 μm to 1 μm were of 43.5 volume %, the particles whose diameter ranges from 0.2 μm to 0.5 μm were of 28.2 volume %, and the particles whose diameter is 0.2 μm or less were of 9.5 volume %.

COMPARATIVE EXAMPLE

To the slip thus produced was added water such that the water was of 27 parts by weight and the alumina was of 100 parts by weight. The slip was stirred for 24 hours while preventing it from being dried, thereby producing Comparative Example whose powder volume fraction F1 was 0.486. The Slip according to Comparative Example was prepared simply by adding water to the slip according to the inventive example because it was necessary to equalize the conditions other than the volume fraction F1 for easy comparison.

The slips according to Inventive and Comparative Examples were aged for two days. Thereafter, the slips were measured for flowability, molded into moldings, the moldings were measured for packing fractions and dry strength, and then fired.

When the slip according to Inventive Example was stirred with a stirring rod, a slight resistance was felt. However, nothing disturbed the pouring of the slip into a mold.

The slip flowability was measured by measuring shear stresses and Shear rates at three points in the slip. The slip viscosity was indicated as an apparent viscosity at the shear rate of 12.6 sec$^{-1}$.

The slips were poured into plaster molds whose interior space was of a size 15 mm × 15 mm × 150 mm. After the slips were deposited, the moldings were removed, and completely dried at 120° C. The powder moldings according to Inventive and Comparative Examples were produced in this manner.

The powder moldings according to Inventive and Comparative Examples were measured for the packing fraction F3 by the Archimedes' method. The powder moldings were also measured for dry strength by the three-point bending test.

Thereafter, the powder moldings were fired at 1,700° C. to achieve a density which is substantially equal to the theoretical density. The linear firing shrinkage percentage is calculated from the packing fraction F3 according to the equation:

$$1 - \sqrt[3]{F3}.$$

The results of the measurement are given in Table 4 below.

TABLE 4

|  | Inventive Example | Comparative Example |
|---|---|---|
| Volume fraction (F1) | 0.671 | 0.486 |
| Shear rate (sec$^{-1}$): | 1.26:10.0 | 1.26:1.28 |
| Shear stress dyne/cm$^2$) | 12.6:105 | 12.6:4.02 |
|  | 31.0:520 | 110:16.0 |
| Viscosity (CP) | 830 | 32 |
| Packing fraction (F3) | 0.785 | 0.629 |
| Dry strength (Kgw/cm$^2$) | 168 | 93.5 |
| Linear firing shrinkage percentage | 7.8 | 14.3 |

As described above, the packing fraction F3 of the powder molding formed according to the present invention is much larger than that of the conventional powder moldings, and hence is of high dry strength. The fired powder molding has a small firing shrinkage percentage.

As understood from the foregoing discussion of the preferred embodiments an important aspect of the invention is the fact that the volume fraction F1 of the initial mixture of the powdery material and the solvent is not only adjusted to exhibit a dilatant flow, but is also selected and adjusted to a value at least as large as a value where a value of the volume fraction F3 of the resulting dried powder molding abruptly rises relative to a small marginal increase of the volume fraction F1. The abrupt rise of exemplary embodiments are indicated in FIG. 3 and Tables 1-3, as discussed above.

When the highly viscous mixture or slip is vibrated, it is rendered easily flowable, so that it can easily be poured into the mold or Otherwise handled with ease.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

I claim:

1. A method of manufacturing a powdery molding of a large packing fraction by slip casting, comprising the steps of:

mixing a powdery material and a solvent into a mixture which exhibits a dilatant flow and which has a volume fraction F1 of said powdery material;

pouring said mixture into a porous mold to make a molding of desired shape which has a volume fraction F2 of said powdery material, said volume fraction F2 being greater than said volume fraction F1;

drying said molding, said dried molding having a volume fraction F3 of said powdery material; and wherein said mixing step further comprises adjusting said volume fraction F1 of said mixture to a value at least as large as a value where a resulting value of said volume fraction F3 abruptly rises relative to a small marginal increase of said volume fraction F1.

2. A method according to claim 1, wherein said adjusting of said volume fraction F1 of said mixture includes adjusting a mixture ratio of said powdery material and said solvent to cause said mixture to exhibit said dilatant flow.

3. A method according to claim 1, wherein said adjusting of said volume fraction F1 of said mixture includes adjusting a particle size distribution of said powdery material to cause said mixture to exhibit said dilatant flow.

4. A method according to claim 2, further including the step of vibrating said mixture when said mixture is molded.

5. A method according to claim 3, further including the step of vibrating said mixture when said mixture is molded.

6. A method according to claim 1, further including the step of vibrating said mixture when said mixture is molded.

7. A method according to claim 6, wherein said vibrating step increases a viscosity of said mixture.

8. A method according to claim 1, wherein said volume fractions F1, F2, F3 satisfy a relationship $F1 < F2 < F3$.

9. A method according to claim 1, including a further step of adding a polycarboxylic acid ammonium salt to said mixture as a dispersing agent.

10. A method according to claim 1, wherein an external force is applied to said mixture as said mixture is poured into said porous mold during said molding of said desired shape, said external force increasing viscosity of said mixture and causing said mixture to be easily pourable.

11. A method of manufacturing a powdery molding with a large packing fraction of a powdery material by slip casting, comprising the steps of:

mixing a powdery material and a solvent into a mixture which has a volume fraction F1 of said powdery material ranging from 0.58 to 0.75;

pouring said mixture into a porous mold to make a molding of desired shape which has a volume fraction F2 of said powdery material, said volume fraction F2 being greater than said volume fraction F1;

drying said molding, said dried molding having a volume fraction F3 of said powdery material; and wherein said mixing step further comprises adjusting said volume fraction F1 of said mixture to a value at least as large as a value where a resulting value of said volume fraction F3 abruptly rises relative to a small marginal increase of said volume fraction F1.

12. A method according to claim 11, further including the step of vibrating said mixture when said mixture is molded.

* * * * *

UNITED STATES PATENT AND TRADEMARK OFFICE
CERTIFICATE OF CORRECTION

PATENT NO. : 5,346,660
DATED : September 13, 1994
INVENTOR(S) : Akio Matsumoto

It is certified that error appears in the above-indentified patent and that said Letters Patent is hereby corrected as shown below:

Column 1, line 52, change "the=e" to --there--;
Column 1, line 65, change "(iI)," to --(II),--;
Column 1, line 66, change "(ZII)," to --(III),--.

Column 2, line 11, change "(Iv)" to --(IV)--;
Column 2, line 33, change "parrOt! es." to --particles.--;
Column 2, line 67, change "snronger" to --stronger--.

Column 3, line 1, change "=he" to --the--;
Column 3, line 10, change "Of" to --of--;
Column 3, line 24, change "no" to --to--;
Column 3, line 48, change "Ceramic" to --ceramic--.

Column 4, line 11, change "slap" to --slip--;
Column 4, line 24, change "o#manufacturing" to --of manufacturing--;
Column 4, line 29, change "=he" to --the--;
Column 4, line 40, change "=he" to --the--;
Column 4, line 62, change "my" to --may--.

Column 5, line 8, change "Of" to --of--;
Column 5, line 31, change "Of" to --of--;
Column 5, line 59, delete "1".

Column 6, line 32, change "NO." to --No.--;
Column 6, line 38, change "slap" to --slip--.

UNITED STATES PATENT AND TRADEMARK OFFICE
CERTIFICATE OF CORRECTION

PATENT NO. : 5,346,660
DATED : September 13, 1994
INVENTOR(S) : Akio Matsumoto

It is certified that error appears in the above-indentified patent and that said Letters Patent is hereby corrected as shown below:

Column 7, line 33, change "increased," to --increased.--;
Column 7, line 33, change "Slip" to --slip--;
Column 7, line 40, change "Casting" to --casting--;
Column 7, line 47, change "slap" to --slip--;
Column 7, line 53, change "there" to --these--.

Column 8, line 31, change "Slip" to --slip--;
Column 8, line 47, change "Shear" to --shear--;
Column 8, line 62, change "C." to --C--;
Column 8, line 67, change "1-(F3)Δ." to --1-(F3)$^{1/3}$.--.

Column 9, line 8, change "dyne/" to --(dyne/--;
Column 9, line 37, change "Otherwise" to --otherwise--.

Signed and Sealed this

Eighth Day of November, 1994

Attest:

BRUCE LEHMAN

Attesting Officer

Commissioner of Patents and Trademarks